3,278,529
NITRO-FURFURYLIDENE ACID HYDRAZIDES
Anthony Holland, Hornchurch, James Martin Inglis, Chipping Ongar, and Ronald Slack, London, England, assignors to May & Baker Limited, Dagenham, England, a British company
No Drawing. Filed Sept. 15, 1961, Ser. No. 138,274
Claims priority, application Great Britain, Sept. 20, 1960, 32,340/60
6 Claims. (Cl. 260—240)

This invention relates to nitrofuran derivatives, to processes for their preparation and compositions containing them.

According to the present invention, there are provided new nitrofuran derivatives of the general Formula I:

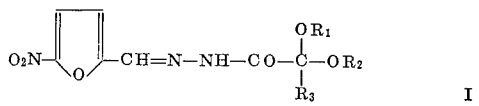

wherein $R_1$ and $R_2$ are methyl groups or together form a divalent group of the formula $-(CH_2R)_n-$, wherein $n$ is 2 or 3, which may optionally be substituted by a methyl group, and $R_3$ represents a hydrogen atom or a methyl group, and salts of such compounds with alkali metals.

These new nitrofuran derivatives have been found to be useful in the treatment of bacterial infections in domestic animals. They are particularly useful in the treatment of poultry diseases, particularly fowl typhoid which is caused by the organism *Salmonella gallinarum*. Until now this latter disease has been treated by the administration of furazolidone [N-5-nitro - 2 - furfurylidene-3-amino-2-oxazolidone] in the diet, but as this compound is insoluble it has not been possible to administer it in the drinking water, which is a particularly advantageous mode of administration. We have now found by extensive research and experimentation that the compounds of general Formula I, in particular 2-methyl-2-(5-nitrofurfurylidene)-hydrazinocarbonyl-1,3-dioxolane and its sodium salt, are as active against *Salmonella gallinarum* as furazolidone, and the sodium salt is sufficiently soluble in water to enable effective doses of the drug to be administered to poultry in their drinking water.

According to a feature of the present invention, the nitrofuran derivatives of general Formula I are prepared by reacting 5-nitrofurfural, or a derivative thereof such as the diacetate, acetal or oxime, with a hydrazide of the general Formula II:

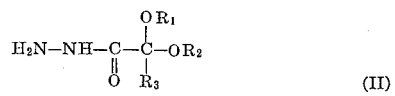

(wherein the various symbols are as hereinbefore defined), preferably in an inert organic solvent, e.g., ethanol, if desired in the presence of a condensing agent.

The starting materials of Formula II may be prepared by reacting an ester of the general Formula III:

(wherein R is a lower alkyl group, such as methyl or ethyl, and $R_3$ is as hereinbefore defined) with methanol or a suitable glycol in the presence of a condensing agent such as anhydrous hydrogen chloride or boron trifluoride, to produce esters of the Formula IV:

(wherein the various symbols are as hereinbefore defined), and treating the esters of Formula IV with hydrazine, usually in the form of the hydrate, with or without the use of a solvent such as methanol, to give the hydrazides of Formula II.

According to a further feature of the invention, the nitrofuran derivatives of general Formula I are prepared by treating 5-nitrofurfural hydrazone with an ester of general Formula IV.

The alkali metal salts of the nitrofuran derivatives of general Formula I may be prepared by known methods, for example, they may be conveniently prepared by treating a hot solution of the compound of Formula I in solvent such as dimethylformamide with an alcoholic solution of sodium or potassium ethoxide, when the required salt separates.

The following examples will serve to illustrate the invention.

*Example I*

Ethyl pyruvate (100 g.) and ethylene glycol (50 cc.) were saturated with hydrogen chloride at 0° C. and the solution was set aside at room temperature. The excess of hydrogen chloride was removed in a stream of air and the solution was neutralised with sodium bicarbonate extracted with ether and the ethereal extract dried over anhydrous potassium carbonate. The ethereal solution was fractionated using a Vigreux column to give 2-ethoxycarbonyl-2-methyl-1,3-dioxolane (43 g.; 32%), B.P. 70–76° C./8 mm.

2-ethoxycarbonyl-2-methyl-1,3-dioxolane (25 g.) was treated with 100% hydrazine hydrate (7.6 g.) and heated to 40° C. for 5 mins. Volatile material was removed under reduced pressure and the residue was collected and washed with ether and ethanol to give 2-hydrazinocarbonyl-2-methyl-1,3-dioxolane (14 g.; 46.5%), M.P. 120° C.

The finely powdered hydrazide (14 g.) was added to 5-nitrofurfural (14 g.) in ethanol (240 cc.) with stirring at room temperature. When a complete solution was obtained, the reaction mixture was filtered and allowed to crystallise. The solid which separated was collected and washed with ethanol to give 2-methyl-2-(5-nitrofurfurylidene)hydrazinocarbonyl-1,3-dioxolane (14 g.; 54%), M.P. 219° C.

The following compounds were prepared in a similar manner from the appropriate starting materials:

2,4 - dimethyl - 2-(5-nitrofurfurylidene)hydrazinocarbonyl-1,3-dioxolane, M.P. 207° C., and Glyoxylic acid 5-nitrofurfurylidene hydrazide dimethyl acetal, M.P. 199° C.

*Example II*

Ethyl pyruvate (11.6 g.) and propane-1,3-diol (7.6 g.) were treated by dropwise addition with boron trifluoride etherate complex (16 cc.) at 0° C. and the mixture was allowed to stand overnight. The resulting solution was poured into saturated sodium bicarbonate solution with ice cooling and the mixture was allowed to stand until the reaction was complete. The bicarbonate mixture was extracted with ether and the etheral extract was dried over anhydrous potassium carbonate. The solvent was removed and the residue was treated with 100% hydrazine hydrate (5 cc.), left to stand overnight and heated on the steam bath for 1 hour. Volatile material was removed by distillation under reduced pressure, the residue dissolved in ethanol and dried over anhydrous sodium sulphate. Nitrofurfural (14 g.) in ethanol (450 cc.) was added to the alcoholate solution and the reaction mixture was filtered and the filtrate allowed to crystallise. The crystalline solid was collected and dried to give 2-methyl-2-(5-nitrofurfurylidene)hydrazinocarbonyl - 1,3 - dioxane (12 g.; 42.5%), M.P. 195° C.

*Example III*

To 2 - methyl - 2 - (5 - nitrofurfurylidene)hydrazinocarbonyl-1,3-dioxolane (10 g.) in dimethylformamide (30 cc.) was added rapidly 7.85% w./v. technical ethanolic sodium ethoxide (43 cc.) in dry ethanol (157 cc.) with stirring. The sodium salt of 2-methyl-2-(5-nitrofurfurylidene)hydrazinocarbonyl-1,3-dioxolane separated immediately as a red solid (9.5 g.; 88%), M.P. 233° C.

The present invention includes within its scope therapeutically useful, more especially veterinary, compositions which comprise one or more of the compounds of general formula I together with a significant amount of a non-toxic carrier which may be either a solid material or a liquid. In practice the compounds of the present invention will be normally administered orally, in consequence of which the preferred compositions are those of the kind suitable for oral administration.

For the treatment of animals, such as poultry with fowl typhoid, the nitrofuran derivatives may be incorporated in the animal foodstuff, i.e., an organic or mineral substance which is intended to be fed to the animals, or drinking water. Incorporation of the active ingredient in the foodstuff, which in the case of fowl may be a commercial starting, laying or growing mash, may be affected by dissolving the nitrofuran in an organic solvent, dispersing the solution so obtained in the food and removing the solvent by any means known to the art. The nitrofuran derivatives may also be incorporated in the foodstuff in the form of a powder containing the active ingredient or ingredients and a solid, non-toxic inert carrier, e.g., talc, kaolin or chalk. To the powders there may be added before admixture to the foodstuff one or more non-toxic wetting and/or dispersing agents, for example, the condensation product of β-naphthalene sulphonic acid and formaldehyde or sodium lauryl sulphate.

For addition to the drinking water the nitrofuran derivatives of the invention are best used in the form of their alkali metal salts, e.g., the sodium salt, which are soluble in water. The solid alkali metal salts may be added to the drinking water as such or in combination with a wetting or dispersing agent. Alternatively the alkali metal salts of the nitrofuran derivatives may be added to the drinking water in the form of a concentrate with or without the addition of wetting and/or dispersing agents in such an amount to provide an effective concentration of the drug. The solubility of the nitrofuran derivatives in water may also be enhanced by formation of addition compounds or salts with organic bases such as piperazine. To ensure maximum stability of aqueous preparations of the nitrofuran derivatives, e.g., when administered to poultry in the drinking water contained in troughs of, for example, galvanised iron, it is advantageous to incorporate a small amount, e.g., 0.0001–0.01% by weight, of a non-toxic oxidising agent, such as sodium or potassium dichromate, in the solution or suspension.

To the compositions may be added other substances known to be useful in the treatment of other diseases, e.g., coccidiosis such as nicarbazin, sulphaquinoxaline and acinitrazole, and other therapeutic agents such as antibiotics, e.g., tetracycline.

The percentage of active ingredient in the compositions of the invention may be varied, it being necessary that it should constitute a proportion such that a suitable dosage for the therapeutic effect desired in the species of animal shall be obtained. Obviously, several unit dosage forms may be administered at about the same time. The preferred percentage of active substances in the compositions is 5 to 50% for veterinary compositions. The veterinary compositions may be diluted before use to contain preferably between 0.005% and 0.5% of the nitrofuran derivative, for example 0.02 to 0.04%.

The following example illustrates therapeutically useful compositions according to the invention.

*Example IV*

A solid mixture containing the following ingredients:

| | G. |
|---|---|
| 2-methyl-2-(5-nitrofurfurylidene)hydrazino-carbonyl-1,3-dioxolane | 4.0 |
| Wheat meal feed run | 54.8 |
| Maize gluten feed | 41.2 | was prepared to give a mixture containing 4.0% of the active ingredient. The active material was administered at a final concentration of 0.04% to poultry by adding 100 g. of the above mixture to 9.9 kg. of feed material.

We claim:

1. A nitrofuran derivative selected from the class consisting of compounds of the formula:

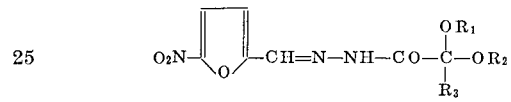

where $R_1$ and $R_2$ when taken separately are methyl groups and when taken together constitute a divalent radical selected from the class consisting of —CH$_2$—CH$_2$—, —CH$_2$—CH$_2$—CH$_2$— and said groups in which one of the hydrogen atoms is replaced by a methyl group and $R_3$ is selected from the class consisting of hydrogen and methyl, and salts of the said compounds with alkali metals.

2. 2 - methyl - 2 - (5-nitrofurfurylidene)hydrazinocarbonyl-1,3-dioxolane.

3. An alkali metal salt of 2-methyl-2-(5-nitrofurfurylidene)hydrazinocarbonyl-1,3-dioxolane.

4. The sodium salt of 2-methyl-2-(5-nitrofufurylidene)-hydrazinocarbonyl-1,3-dioxolane.

5. 2,4 - dimethyl - 2 - (5-nitrofurfurylidene)hydrazinocarbonyl-1,3-dioxolane.

6. An alkali metal salt of 2,4-dimethyl-2-(5-nitrofurfurylidene)hydrazinocarbonyl-1,3-dioxolane.

References Cited by the Examiner

UNITED STATES PATENTS

| 2,319,481 | 5/1943 | Stillman | 167—63 |
| 2,855,407 | 10/1958 | McDowell | 260—347.7 |
| 2,895,965 | 7/1959 | Eugster | 260—347.7 |
| 2,995,490 | 8/1961 | Brubaker | 167—53.1 |
| 3,001,909 | 9/1961 | Sarett | 167—53.1 |
| 3,026,332 | 3/1962 | Holland et al. | 260—240 X |

OTHER REFERENCES

Fieser et al.: Organic Chemistry, 3rd ed., p. 215, D. C. Heath and Co., Boston (1958).

Yurev et al.: Zhur. Obschei Khim, vol. 30, p. 98 (1959).

JOHN D. RANDOLPH, *Primary Examiner.*

S. ROSEN, *Assistant Examiner.*